United States Patent [19]

Ebbrecht et al.

[11] Patent Number: 5,552,506

[45] Date of Patent: Sep. 3, 1996

[54] ORGANOPOLYSILOXANES, MODIFIED WITH ACRYLATE GROUPS IN THE PRESENCE OF A RHODIUM CATALYST

[75] Inventors: Thomas Ebbrecht, Witten; Peter Lersch, Oberhausen; Dietmar Wewers, Bottrop, all of Germany

[73] Assignee: Th. Goldschmidt AG, Essen, Germany

[21] Appl. No.: 308,016

[22] Filed: Sep. 10, 1994

[51] Int. Cl.$^6$ .......................... C08G 77/08; C08G 77/20
[52] U.S. Cl. .................. 528/15; 528/26; 522/99
[58] Field of Search ................. 522/99; 528/15, 528/26

[56] References Cited

U.S. PATENT DOCUMENTS

| | | | |
|---|---|---|---|
| 3,890,359 | 6/1975 | Chandra | 260/429 R |
| 3,928,629 | 12/1975 | Chandra et al. | 427/387 |
| 3,960,810 | 6/1976 | Chandra et al. | 260/46.5 UA |
| 4,123,604 | 10/1978 | Sandford, Jr. | 528/31 |
| 4,262,107 | 4/1981 | Eckberg | 528/15 |
| 4,472,563 | 9/1984 | Chandra et al. | 528/15 |
| 4,565,714 | 1/1986 | Koshar | 528/15 |
| 4,609,574 | 9/1986 | Keryk et al. | 528/15 |
| 4,725,630 | 2/1988 | Magee et al. | 522/99 |
| 4,908,274 | 3/1990 | Jachmann et al. | 522/99 |
| 4,961,963 | 10/1990 | Peters | 528/15 |

FOREIGN PATENT DOCUMENTS

| | | |
|---|---|---|
| 2747233 | 7/1978 | Germany. |
| 2948708 | 8/1980 | Germany. |
| 3710238 | 3/1987 | Germany. |
| 3810140 | 3/1988 | Germany. |
| 3820294 | 6/1988 | Germany. |

OTHER PUBLICATIONS

Bruce J. Kokko, Silicone Acrylates Through The . . . , Journal of Applied Polymer Science, vol. 47, 1309–1314, (1993).

Primary Examiner—Susan W. Berman
Attorney, Agent, or Firm—Anderson Kill Olick & Oshinsky, P.C.

[57] ABSTRACT

Organopolysiloxanes, which terminally, laterally or both have at least one group of the formula

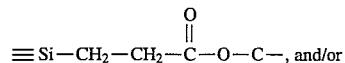 , and/or

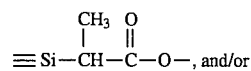 , and/or

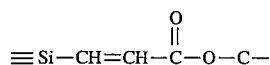

well as at least one acrylate group, linked over a bridge element to this group, is obtained by hydrosilylation of organopolysiloxanes with at least one SiH group by compounds, which have at least two acrylate groups, in equimolar amounts at a temperature of 60° to 130° C. in presence of rhodium catalysts. The rhodium catalysts cause a 1,2 addition to take place during the addition reaction between polyacrylates and hydrogen siloxanes.

7 Claims, No Drawings

ORGANOPOLYSILOXANES, MODIFIED WITH ACRYLATE GROUPS IN THE PRESENCE OF A RHODIUM CATALYST

FIELD OF INVENTION

The invention relates to organopolysiloxanes, which terminally and/or laterally have at least one group of the formula

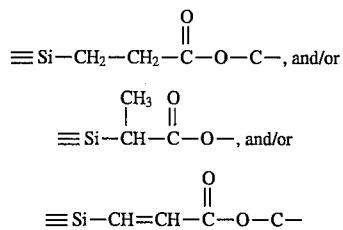

as well as at least one acrylate group, linked over a bridge element to this group.

BACKGROUND INFORMATION AND PRIOR ART

Organopolysiloxanes, modified with acrylate ester groups (acrylate groups), have proven their value as high energy radiation-curable binders, for example for printing inks and for the manufacture of lacquer vehicles or coating agents for paper, wood and metal surfaces. In particular, these can be employed as abhesive coating agents. Curing takes place in a very short time particularly after the addition of known initiators, such as benzophenone and its derivatives, by UV radiation or by electron beam curing.

The acrylate-containing groups can be bonded to the backbone of the organopolysiloxane by way of SiOC or SiC bonds. In this connection, there is an extensive state of the art, of which the following patents have been selected as typical examples.

Organopolysiloxanes, the acrylate ester-containing organic groups of which are linked to the polysiloxane backbone over SiOC bonds, can be synthesized according to a method of the German patent 27 47 233 by reacting (meth)acrylate esters, having —COH groups, with organopolysiloxanes, having SiX groups, wherein X is an alkoxy, hydroxy or chlorine group, owing to the fact that organopolysiloxanes of the formula

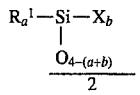

wherein

R$^1$ is an alkyl group with 1 to 4 carbon atoms and/or a phenyl group;

X is chlorine or OR$^2$ group;

R$^2$ is an alkyl group with 1 to 4 carbon atoms and/or hydrogen;

a is 1.0 to 2.0;

b is 0.02 to 1.6; and a+b is at least 2.66;

are used as organopolysiloxane, the siloxane molecule having 3 to 100 silicon atoms and pentaerythritol tri(meth)acrylate being used as (meth)acrylate ester in 0.05 molar to equimolar amounts, based on the COH and SiX groups.

In a modification of this method, the procedure of the German patent 29 48 708 is employed and organopolysiloxanes of the formula

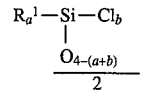

(R$^1$=alkyl with 1 to 4 carbon atoms, vinyl and/or phenyl, with the proviso that at least 90 mole percent of the R$^1$ groups are methyl groups, a has a value of 1.8 to 2.2 and b a value of 0.004 to 0.5) are reacted initially with, based on the SiCl groups, at least 2 moles of a dialkylamine, the alkyl groups of which in each case have 3 to 5 carbon atoms and the carbon atoms of which, adjacent to the nitrogen, carry at most one hydrogen atom each, and the reaction product is then reacted with at least equimolar amounts of pentaerythritol triacrylate or pentaerythritol trimethacrylate, after which the product is separated from suspended solid components in it by known methods.

Organopolysiloxanes with acrylate ester-containing organic groups linked over an SiC bond with the polysiloxane backbone, typically, can be synthesized by reacting a hydrogensiloxane in an addition reaction with an alcohol having an olefinic double bond, such as allyl alcohol, in the presence of a platinum catalyst and then reacting the hydroxyl group of this alcohol with acrylic acid or a mixture of acrylic acid and other, optionally saturated acids. This method is described, for example, in the German patent 38 10 140.

A further possibility of synthesizing acrylate-modified polysiloxanes with SiC linkage of the modifying group(s) consists therein that allyl glycidyl ether or a different suitable epoxide with an olefinic double bond is added in an addition reaction to a hydrogensiloxane and, after the addition reaction, the epoxide is esterified with acrylic acid with opening of the epoxide ring. This method is described in the German patent 38 20 294.

The German patent 37 10 238 discloses compounds of the general formula

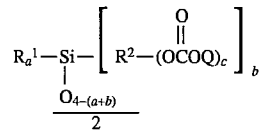

wherein

R$^1$ is an alkyl group with 1 to 4 carbon atoms, a phenyl group or an alkaryl group of the general formula

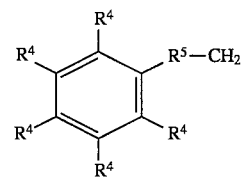

wherein

R$^4$ are the same or different and represent a hydrogen group, an alkyl group with 1 to 12 carbon atoms and/or a halogen group, R$^5$ represents linear or branched alkylene groups with 1 to 8 carbon atoms, it being possible for these groups to be adjacent to one another in the average molecule, R$^2$ is a (c+1) valent hydrocarbon bridge with 1 to 20 carbon atoms, which may have ether groups and to which lateral methacrylate groups may be linked, Q is a diol or polyol group with 1 hydroxyl group less, the remaining hydroxyl group(s) of which is (are) esterified with (meth)acrylic acid the diols or polyols being selected from the group comprising ethylene glycol, propylene glycol, glycerin, trimethylolethane, trimethylolpropane, pentaerythritol and their dimers and polymers formed by intermolecular condensation, ethylene oxide and/or propylene oxide optionally being added in an addition reaction to these polyols, a is 1.6 to 2.2, b is 0.001 to 1.6, c is 1 to 4, and a+b is at most 3.

These compounds can be synthesized by reacting a) organopolysiloxanes of the general formula

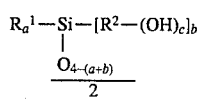

wherein $R^1$, $R^2$, a, b and c are as already defined, with, based on the hydroxyl groups, at least equimolar amounts of compounds of the general formula

wherein $R^3$ is a chlorine group or an alkoxy group with 1 to 4 carbon atoms, optionally removing the excess amounts of the compound

and reacting the reaction product thus obtained with, based on the $R^3$ group, equimolar amounts of the compound of the general formula Q—OH, in which Q is as already defined, or b) initially reacting compounds of the formula Q—OH with at least equimolar amounts of the compound of the formula

and reacting the reaction product with equimolar amounts of organopolysiloxane under reaction conditions otherwise described in a).

Furthermore, the U.S. Pat. No. 4,725,630 discloses the reaction of mercaptopropyl groups with acrylate esters, such as pentaerythritol triacrylate or tetraacrylate. Admittedly, it is possible to add one of the acrylate groups directly to the mercaptopropyl group. However, the method has not attained practical importance, since it is expensive and the products have a very unpleasant odor.

It is well known to those skilled in the art that the acrylate-modified organopolysiloxanes, in which the organic groups, which carry the acrylate group or groups, are linked over SiC bonds to the siloxane backbone, are superior with respect to the resistance to hydrolysis to the compounds in which said organic groups are linked over an SiOC bond.

It would be of considerable advantage for the synthesis of SiC-linked and acrylate-modified organopolysiloxanes, if compounds with at least two acrylate groups could be added directly in an hydrosilylation reaction to hydrogensiloxanes. This procedure cannot be inferred from the patent literature.

In the "Journal of Applied Polymer Science", Volume 47, 1309 to 1314 (1993), a method is described for reacting organic polyacrylates with hydrogensiloxanes. For this method, the organic polyacrylate, namely 1,6-hexylene glycol diacrylate or trimethylolpropane triacrylate is to be used in a considerable excess, so that only one of the two or three olefinic groups reacts with the hydrogensiloxane. This reaction shall be carried out in the presence of platinum catalysts. It was reported in this paper that the excess of polyacrylate is necessary in order to avoid a gelling of the product during the hydrosilylation reaction or the subsequent storage. The product can be cured by radiation, but exhibits a great decrease in the release effect during storage. Such a product is therefore not usable industrially as an abhesive coating composition.

According to the publication, the reaction proceeds as follows:

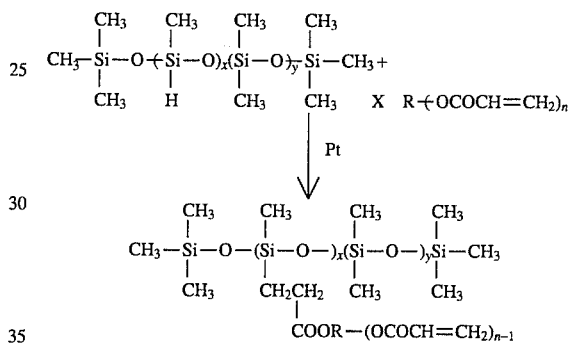

However, when this method was repeated, it was observed that the reaction proceeded differently from the way described above. Whereas the above reaction equation would be based on a 1,2 addition at the C=C double bond with formation of an Si—C linkage, spectroscopic investigations showed that, under the given conditions, an addition at the C=O double bond with formation of the 1,2- and 1,4—Si—O—C-linked reaction products takes place.

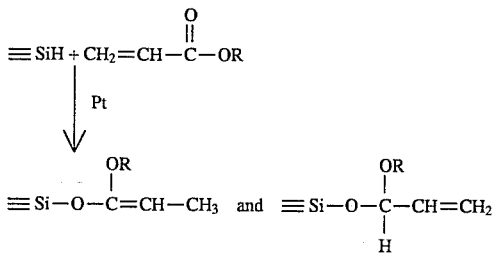

For the methods described in the aforementioned publications, products with an SiOC link are obtained and not the desired organopolysiloxanes with an SiC link and modified with acrylate groups. It is to be assumed that the ≡Si—O—C-linked products are responsible for the gelling and the decrease in release effect upon ageing.

The present invention is concerned with the technical problem of the direct addition of polyacrylates to hydrogensiloxanes by 1,2 addition according to the following reaction equation:

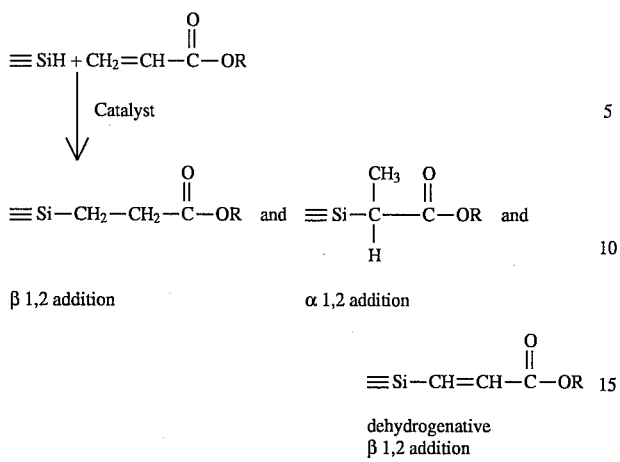

β 1,2 addition      α 1,2 addition dehydrogenative
β 1,2 addition

The β addition products (—SiCH$_2$—CH$_2$—COOR and Si—CH=CH—COOR) are thermodynamically particularly stable and therefore are preferred addition products.

Surprisingly, it was found that the desired Si—C linking takes place when rhodium catalysts are used as catalysts. Moreover, the selectivity for the preferred β 1,2 addition products is very high.

OBJECT OF THE INVENTION

An object of the present invention is an organopolysiloxane having terminally, laterally or both at least one group of the formula

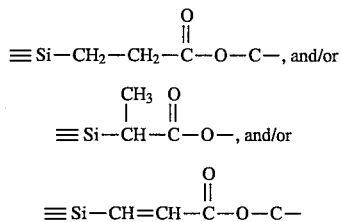

and at least one acrylate group linked over a bridging element to this group and are obtainable by the hydrosilylation of organopolysiloxanes with at least one SiH group with compounds which have at least two acrylate groups, in equimolar amounts at temperatures of 60° to 130° C. and preferably of 80° to 110° C. in the presence of rhodium catalysts.

SUMMARY OF THE INVENTION

As rhodium catalysts, preferably those catalysts, selected from the group comprising RhX$_3$.xH$_2$O, RhX$_3$(SR$^2{}_3$)$_3$, RhX(R$^3{}_3$P)$_3$, RhX(CO) (R$^3{}_3$P)$_3$, RhH(R$^3{}_3$P)$_4$, RhR$^4{}_3$, Rh(CO)$_2$R$^4$, (RhX(olefin))$_2$, are selected, wherein X is a halogen group, preferably the chlorine group, R$^3$ is an alkyl group with 1 to 20 carbon atoms, an alkenyl group with 2 to 20 carbon atoms or the R$^{33}$SiQ group, in which Q is a divalent aliphatic group with 1 to 6 carbon atoms, R$^4$ is the 2,4-pentanedionato group, olefin is cyclooctadiene or norbornadiene, and x is a number from 0 to 4.

Especially preferred is the hydrosilylation in the presence of one of the following rhodium catalysts: RhCi(Ph$_3$P)$_3$, wherein Ph is phenyl), RhCl$_3$.3H$_2$O, (RhCl(ethylene)$_2$)$_2$ or (RhCl(cyclooctadiene))$_2$.

$^1$H—, $^{13}$C— and $^{29}$Si-NMR spectroscopic analyses reveal that the products of the rhodium-catalyzed hydrosilylation reaction are practically exclusively the result of a 1,2 addition with the formation of the desired SiC-linked products.

The reaction is carried out with equimolar amounts of reactants, that is, so that a compound with at least two acrylate groups corresponds to one SiH group. The reaction temperature is about 60° to 130° C. and preferably 80° to 110° C.

The reaction can be carried out in the presence of inert solvents, such as toluene. Preferably, however, the use of a solvent is avoided.

The addition of stabilizers, which act as polymerization inhibitors, is advantageous for the synthesis. Phenothiazine, methoxyphenol, hydroquinone and their derivatives, as well as copper and copper compounds are used here.

Preferably, the hydrosilylation is carried out with hydrogenpolysiloxanes of the general formula

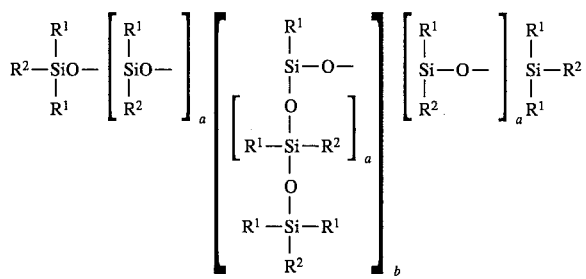

wherein

R$^1$ groups are the same or different and represent alkyl groups with 1 to 4 carbon atoms or phenyl groups, with the proviso that at least 90% of the R$^1$ groups are methyl groups, R$^2$ groups are identical with R$^1$ groups or are hydrogen groups, with the proviso that at least one R$^2$ group is a hydrogen group, and subscript a has an average value of 1 to 100, and b has an average value of 1 to 5.

The R$^1$ groups, which can be same or different in the molecule, are alkyl groups with 1 to 4 carbon atoms, such as methyl, ethyl, propyl or butyl groups, or phenyl groups. However, the condition must be fulfilled that at least 90% of the R$^1$ groups are methyl groups.

At least one R$^2$ group must be a hydrogen group. The remaining R$^2$ groups then have the meaning of the R$^1$ groups. Polysiloxanes with 2 to 10 SiH groups are preferred.

Subscript a has an average value of 0 to 200 and preferably an average value of 1 to 50; subscript b has an average value of 0 to 5 and preferably one of 0 to 2.

Examples of suitable organic acrylates are (EO=—C$_2$H$_4$O—):

a) Diacrylates
CH$_2$=CH—COO—(CH$_2$)$_n$—OCO—CH=CH$_2$      alkylene glycol diacrylate -continued

 branched alkylene glycol diacrylate

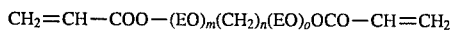 ethoxylated alkylene glycol diacrylate

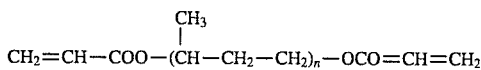

(poly)ethylene glycol diacrylate

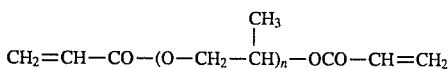 (poly)propylene glycol diacrylate

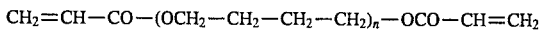 (poly)butylene glycol diacrylate

 substituted bisphenol A derivative b) Triacrylates

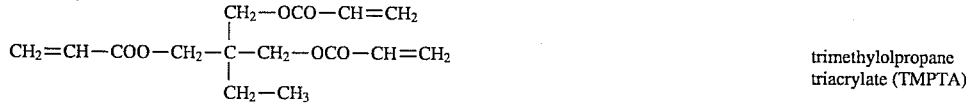 trimethylolpropane triacrylate (TMPTA)

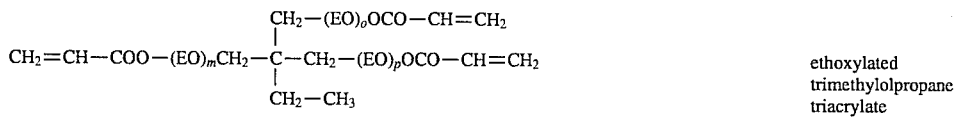 ethoxylated trimethylolpropane triacrylate $$CH_2=CH-COO-CH_2-\underset{|}{CH}-CH_2-OCO-CH=CH_2$$
$$\phantom{CH_2=CH-COO-CH_2-}OCO-CH=CH_2$$
glycerin triacrylate $$CH_2=CH-COO-(EO)_mCH_2-\underset{|}{CH}-CH_2-(EO)_pOCO-CH=CH_2$$
$$\phantom{CH_2=CH-COO-(EO)_mCH_2-}OCO-CH=CH_2$$
ethoxylated glycerin triacrylate c) Tetraacrylate

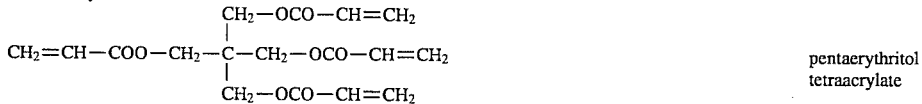 pentaerythritol tetraacrylate

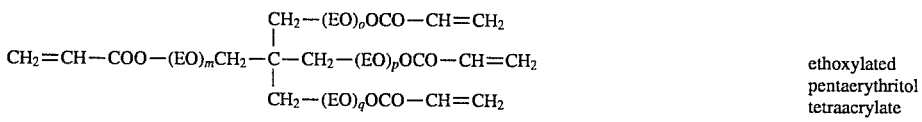 ethoxylated pentaerythritol tetraacrylate d) Multifunctional Acrylates

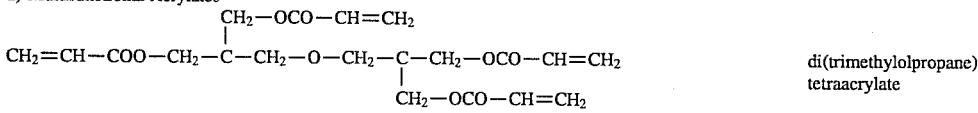 di(trimethylolpropane) tetraacrylate

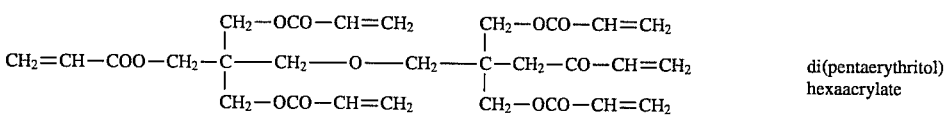 di(pentaerythritol) hexaacrylate

Especially preferred is the addition reaction between acrylate esters of dihydric to hexahydric, aliphatic, linear or branched alcohols, as compounds containing acrylate groups, and the SiH group(s) of the organopolysiloxane.

Especially preferred is the addition reaction between 1,6-hexylene glycol acrylate, neopentyl glycol diacrylate, tetraethylene glycol diacrylate, polypropylene glycol diacrylate, tetraethylene glycol diacrylate, glycerin triacrylate, trimethylolpropane triacrylate or pentaerythritol tetraacrylate, as compounds containing acrylate groups, and the organopolysiloxane.

The advantages of the present invention may be summarized as follows:

1. The inventive method is a simple one with easily accessible starting materials and a high selectivity for SiC-linked addition products, particularly for β 1,2 products.

2. An excess of acrylate component is not required for the hydrosilylation.

3. The products have outstanding long-term storage stability.
4. High-speed curing of the products on the backing material is possible.
5. According to the release values, there is little or no change in the abhesiveness of the cured products over time.

On the basis of the 1,2 addition and the therewith accomplished SiC linking, it is possible to equilibrate the products by acid catalysis with cyclic siloxanes to any chain length, without splitting off the modifying group.

The inventive compounds can also be used as radiation-curing lacquers or coating compositions or as additives in such systems. They can be compounded in the usual manner with curing initiators, fillers, pigments and other conventional additives. The inventive compounds can be cross-linked three-dimensionally by free radicals and cured thermally with addition of, for example, peroxides, or under the influence of high energy radiation, such as UV or electron beam radiation, within a very short time to mechanically stable and chemically resistant layers, which have predeterminable abhesive properties, provided that the composition of the inventive compounds is appropriate. If UV light is used as the source of radiation, the cross-linking preferably takes place in the presence of photoinitiators and/or photosensitizers such as benzophenone and its derivatives or benzoin and corresponding, substituted benzoin derivatives.

Photoinitiators and/or photosensitizers are used in the compositions containing the inventive organopolysiloxanes preferably in amounts of 0.01 to 10% by weight and particularly of 0.1 to 5% by weight, in each based on the weight of the acrylate-functional organopolysiloxanes.

The following examples illustrate the synthesis of the inventive compounds as well as their application properties, it being understood that the examples are provided by way of illustration and not by way of limitation.

EXAMPLE 1

A polydimethylsiloxane with terminal SiH groups (50.1 g, 0.09 moles, 0.18 equivalents of SiH), having an average chain length of N=8 and the general formula $HMe_2SiO(SiMe_2O)_8SiMe_2H$, 19.2 mg (=20 ppm of Rh) of chloro[tris(triphenylphosphine)]rhodium(I) $(RhCi(Ph_3P)_3)$ and 20 mg of phenothiazine are added to a 250 mL 4-neck flask, equipped with stirrer, dropping funnel, thermometer and reflux condenser and heated with stirring to 80° C. At this temperature, 52.1 g (0.176 moles, 0.53 equivalents of C=C) of trimethylolpropane triacrylate (Laromer TMPTA; BASF) are added dropwise over a period of 30 minutes. At the end of the reaction, stirring is continued at 80° C. until, after 5 hours, a conversion of more than 99% is attained. The conversion is checked by determining the SiH value hourly.

After that, the reaction is terminated and the reaction mixture is freed from catalyst residues by filtration and from volatile by-products by distillation under the vacuum of an oil pump The reaction product, obtained in a yield of 93% is clear colored slightly reddish and has a viscosity of 420 mPas at 20° C. The V properties of the product, when kept in the dark at 70° C. for a period of more than four weeks, do not change and there is no gelling.

Analytical investigations by means of $^1H$—, $^{13}C$— and $^{29}Si$-NMR confirm the expected structure and show that the addition product of the starting components can be described by Formula I (according to the spectroscopic data):

$R*Me_2SiO(SiMe_2O)_8SiMe_2R*$ with

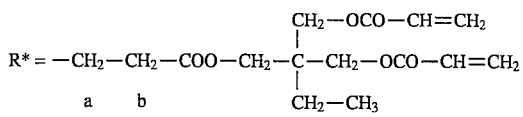

(β 1,2 addition product)

Spectroscopic data:
$^1H$-NMR $(CDCl_3)$: δ = 0.85 (m, a), 2.35 (t, b)
$^{29}Si$-NMR $(CDCl_3)$: δ 7.5 $(Si-CH_2-CH_2)$ or

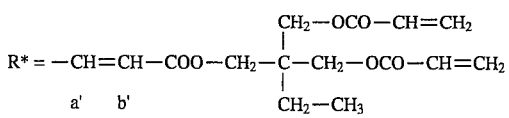

(β 1,2 dehydrogenative addition, (E)-3-silyl propenoate)

Spectroscopic data:
$^1H$-NMR $(CDCl_3)$: δ = 6.25 ppm (d, a'), 7.16 (d, b')
$^{29}Si$-NMR $(CDCl_3)$: δ = -3.9 $(Si-CH=CH-)$ The ratio of the two addition products of TMPTA thus is about 1:1. The α 1,2 addition product was not detectable (≦1%).

EXAMPLE 2

In a manner similar to that of Example 1, 96.9 g (0.044 moles) of a polydimethylsiloxane with terminal SiH groups and an average chain length of N=30 is subjected to a hydrosilylation reaction with 26.1 g (0.088 moles) of trimethylolpropane triacrylate, 22.3 mg (=20 ppm of RH) of chlorotris(triphenylphosphine)rhodium(I) $(RhCi(Ph_3P)_3)$ being used as catalyst and 25 mg of phenothiazine as polymerization inhibitor. After working up, 115 g (corresponding to 95% of the theoretical yield) of a clear reaction product with a viscosity of 700 mPas is obtained. On the basis of spectroscopic data, the reaction product can be described by Formula II, $R*Me_2SiO(SiMe_2O)_{28}SiMe_2R*$ wherein R, is identical with the R* of Formula I.

EXAMPLE 3

A polydimethylsiloxane with terminal SiH groups (200 g, 0.053 moles), having an average chain length of N=50, 30.1 g (0.10 moles) of trimethylolpropane triacrylate, 20.8 mg (=10 ppm of Rh) of chlorotris(triphenylphosphine)rhodium(I) $(RhCi(PH_3P)_3)$ and 40 mg of phenothiazine as polymerization inhibitor are added at room temperature to a 500 mL 4-neck flask. After that, the mixture is heated with stirring to 100° C. When a conversion of more than 99% is reached (after about 2 hours), the reaction product is worked up in the manner described above. A yellow reaction product (216 g, corresponding to 94% of the theoretical yield) with a viscosity of 750 mPas is obtained, which can be described, according to the spectroscopic data, by the general formula $R*Me_2SiO(SiMe_2O)_{48}SiMe_2R*$.

EXAMPLE 4

A polydimethylsiloxane (70.0 g, 0.036 moles) with lateral SiH groups of the general formula $MD_{20}D^H{}_5M$ and average total chain length of N=27, 40 mL of toluene and 22.1 mg (=22 ppm of Rh) of chlorotris(triphenylphosphine)rhodium(I) $(RhCI(Ph_3P)_3)$, as well as with 24 mg of phenothiazine are added to a 250 mL 4-neck flask, equipped with stirrer, dropping funnel, thermometer and reflux condenser and heated with stirring to 100° C. At this temperature, 40.4 g (0.177 moles) of 1,6-hexylene glycol diacrylate (Laromer HDDA, BASF) are added dropwise within 30 minutes in such a manner that a temperature of 110° C. is not exceeded despite the moderate exothermic reaction that sets in. At the end of the addition, the reaction mixture is stirred at 100° C. until a check of the conversion by means of the SiH value shows that the HDDA has been added on completely in a hydrosilylation reaction. At a conversion in excess of 99%, the reaction is terminated. After that, the reaction mixture is filtered and the solvent and volatile by-products are removed by distillation.

The acrylate-functional siloxane copolymer reaction product has a viscosity of 1310 mPas and, according to analytical results, the anticipated average composition $Me_3SiO(SiMe_2O)_{20}(SiMeR*O)_5SiMe_3$ with $R*$=—$CH_2$-$CH_2$-COO-$CH_2$-$(CH_2)_4$-$CH_2$-OCO-CH=$CH_2$ (a β-addition product) or $R*$=—CH=CH-COO-$CH_2$—$(CH_2)_4$-$CH_2$OCO-CH=$CH_2$ (an (E)-3-silyl propenoate).

EXAMPLE 5

The reaction product from Example 1 (20.0 g, 0.017 moles) is stirred for 6 hours under a nitrogen atmosphere at 100° C. with 117.2 g of decamethylcyclopentasiloxane (0.31 moles) and 0.39 g (0.3% by weight) of trifluoromethanesulfonic acid. While the reaction mixture is being cooled, 2.6 g of sodium carbonate and 0.5 g of distilled water are added and stirred, until an examination of the mixture for traces of acid is negative. After the filtration, the volatile components are distilled off at a temperature of 80° C. and a pressure of 2 torr. A yellow, slightly cloudy product with a viscosity of 1520 mPas is obtained in a yield of 123 g, corresponding to 90% of the theoretical yield. According to analysis by means of NMR spectroscopy, the average chain length is 100 and in gel permeation chromatography (GPC), the product has a uniform peak for a monomodal molecular weight distribution and can be described by the formula $R*Me_2SiO(SiMe_2O)_{98}SiMe_2R*$.

EXAMPLE 6

A polydimethylsiloxane (34.3 g, 0.06 moles, 0.12 equivalents of SiH) with terminal SiH groups and an average chain length of N=8 and the general formula $HMe_2SiO(SiMe_2O)_8SiMe_2H$, 8.2 mg (=15 ppm of Rh) of chlorotris(triphenylphosphine)rhodium(I) ($RhCl(Ph_3P)_3$) and 12 mg of phenothiazine are added to a 250 mL 4-neck flask equipped with stirrer, dropping funnel, thermometer and heated with stirring to 90° C. At this temperature, 23.7 g (0.12 moles, 0.24 equivalents of C=C) of 1,4 butylene glycol diacrylate are added dropwise within 20 minutes, so that the temperature does not exceed 100° C. despite the exothermic reaction. At the end of the addition, the reaction mixture is stirred at 100° C. until, after about 2 hours, a conversion of more than 99% is attained.

After cooling and working up, a clear reaction product of low viscosity is obtained in a 95% yield. On the basis of spectroscopic data, it corresponds to the anticipated structure $R*Me_2SiO(SiMe_2O)_8SiMe_2R*$
with $R*$=-$CH_2$-$CH_2$-COO-$CH_2$-$CH_2$-$CH_2$-$CH_2$-OCO-CH=$CH_2$ (β addition product)
or $R*$=-CH=CH-COO-$CH_2$-$CH_2$-$CH_2$-$CH_2$-OCO-CH=$CH_2$ ((E)-3-silyl propenoate)

Examples Not of the Invention

EXAMPLE 7

The procedure of Example 1 is repeated with the change that, instead of the rhodium catalyst, an amount of Karstedt catalyst, corresponding to 20 ppm of platinum, is used as hydrosilylation catalyst. It was not possible to obtain a liquid reaction product. Instead, the formulation gelled after about 3 hours of reaction time.

EXAMPLE 8

The procedure of Example was repeated with the change that an excess of trimethylolpropane triacrylate was used. In analogy to Example 1, 50.1 g (0.09 moles, 0.18 equivalents of SiH) of a polydimethylsiloxane with terminal SiH groups and an average total chain length of N=8, Karstedt catalyst corresponding in amount to 20 ppm of platinum and 20 mg of phenothiazine were added to the reaction flask, the temperature was raised to 80° C. with stirring and 60.1 g (0.203 moles, 0.61 equivalents of C=C) of TMPTA were added dropwise within 30 minutes.

At the end of the addition, stirring of the reaction mixture at 80° C. is continued until, after 4 hours, a conversion of more than 99% is achieved. After residues of the catalyst are removed by filtration, a milky white reaction product with a viscosity of 970 mPas is obtained. In contrast to the inventive product of Example 1, the product is not stable when stored. Even when kept in the dark at room temperature, the viscosity increases with time and, after about 5 days, the reaction product is a soft, white gelatinous mass.

Analytical examinations by means of $^1H$—, $^{13}C$— and $^{29}Si$-NMR show that the addition product of the starting components (according to the spectroscopic data) can be described as consisting essentially of Si—O—C-linked products obtained through 1,4-addition and that the content of Si—C-linked products in the reaction mass is less than 10% by weight.

EXAMPLE 9

The procedure of Examples 7 and 8 was modified in that the method described in the Journal of Applied Polymer Science, vol. 47, 1309–1314 (1993) was followed, that is, that the molar ratio of TMPTA to SiH was increased even further to a value of 1.5:1 and the reaction was carried out with the addition of a small amount of toluene. After 2 hours of reaction time, a conversion of more than 99% was already achieved. The analytical examination of the milky white reaction product by means of $^1H$—, $^{13}C$— and $^{29}Si$-NMR, however, showed that the addition product of the starting components (according to the spectroscopic data) this time also consists essentially of an Si—O—C-linked product resulting from a 1,4 addition. This product also is not stable.

Because of the high degree of dilution due to the high proportion of TMPTA, the viscosity increase admittedly is less pronounced. Nevertheless, the reaction product here also is completely gelled after being kept in the dark for 14 days at room temperature.

Testing the Application

To check the application properties of the substances that are to be used pursuant to the invention, the products of the Examples as well as the comparison products, which are not of the invention, are applied on thin supports (oriented polypropylene film) and cured by the action of 2 MRad of electron beams (EBC) or, after the addition of the photoinitiator (Darocure® 1173, Ciba Geigy) by the action of ultraviolet light (UVC) with 120 W/cm with sheet speeds of 20 m/min. The amount applied in each case is about 0.8 g/m².

Release Value

To determine the release values, different 25 cm wide adhesive tapes of the Beiersdorf Company are used, namely an adhesive tape coated with acrylate adhesive, commercially obtainable under the name of TESA® 7475, as well as adhesive tapes coated with rubber adhesives, commercially obtainable under the names of TESA® 7476 and TESA® 4514. To measure the abhesiveness, these adhesive tapes were rolled onto the substrate and subsequently kept under a weight of 70 g/cm$^2$ at 70° C. in the case of TESA® 4154 and at 40° C. in the case of TESA® 7475 and of TESA® 7476. After 24 hours, the force is measured, which is required in order to pull the respective adhesive tape from the substrate at a speed of 30 cm/min under a peel angle of 180°. This force is referred to as the release value. The general test procedure corresponds essentially to the FINAT Test Method No. 10. To check the ageing behavior, the samples are kept for 7 and 14 days under the conditions described above.

Loop Test

The loop test is used for quickly determining the degree of curing of a release coating. For this purpose, an approximately 20 cm long strip of an adhesive tape from the Beiersdorf Company, obtainable commercially under the name of TESA® 4154, is rolled three times onto the substrate and pulled off again immediately. A loop is then formed by placing the ends of the adhesive tape together, so that the adhering surfaces of the two ends are in contact over a distance of about one centimeter. The ends are then pulled apart again. As they are being pulled apart, the surface in contact should migrate uniformly to the center of the adhesive tape.

In the case of contamination with poorly cured release material, the adhesive force of the adhesive tape no longer is sufficient for holding the surfaces in contact together during the pulling apart. In this case, the sample is regarded as having failed the test.

Subsequent Adhesion

The subsequent adhesion is determined in accordance with the Finat Test Specifications No. 11. For this purpose, the TESA® 7475 adhesive tape of Beiersdorf is rolled onto the substrate and subsequently kept at 70° C. under a weight of 70 b/cm$^2$. After 24 hours, the adhesive tape is pulled from the substrate and rolled onto a steel plate. After one minute, the force is measured, which is required to pull the adhesive tape from the steel plate at a peel angle of 180° and a speed of 30 cm/min. The value so measured is divided by the value produced by an untreated adhesive tape under otherwise the same test conditions. The result is referred to as the subsequent adhesion and usually stated in percent.

Subsequent Adhesion and Loop Tests of the Inventive Examples 1 to 6 and the Comparison Examples 8 to 9

| Example | Subsequent Adhesion | Loop Test |
|---|---|---|
| 1 | 96% | OK |
| 2 | 93% | OK |
| 3 | 91% | OK |
| 4 | 95% | OK |
| 5 | 85% | OK |
| 6 | 92% | OK |
| 8 | <50% | not OK |
| 9 | 78% | OK |

Release Values of the Inventive Examples 1 to 6:

Example 1

| Curing | Release Value for Tesa$^R$ 4154 | Release Value for Tesa$^R$ 7475 | | |
|---|---|---|---|---|
| | | 1 Day | 7 Days | 14 Days |
| Electron beam | 851 cN | 2135 cN | 2090 cN | 2140 cN |

Example 2

| Curing | Release Value for Tesa$^R$ 7475 | | | Release Value for Tesa$^R$ 7476 | | |
|---|---|---|---|---|---|---|
| | 1 Day | 7 Days | 14 Days | 1 Day | 7 Days | 14 Days |
| UV | 291 cN | 306 cN | 281 cN | 104 cN | 118 cN | 115 cN |
| Electron beam | 272 cN | 288 cN | 278 cN | 178 cN | 189 cN | 205 cN |

Example 3

| Curing | Release Value for Tesa$^R$ 7475 | | | Release Value for Tesa$^R$ 7476 | | |
|---|---|---|---|---|---|---|
| | 1 Day | 7 Days | 14 Days | 1 Day | 7 Days | 14 Days |
| UV | 13 cN | 13 cN | 11 cN | 63 cN | 60 cN | 61 cN |

Example 4

| Curing | Release Value for Tesa$^R$ 4154 | Release Value for Tesa$^R$ 7475 |
|---|---|---|
| Electron beam | 289 cN | 228 cN |

Example 5

| Curing | Release Value for Tesa$^R$ 7475 | | | Release Value for Tesa$^R$ 7476 | | |
|---|---|---|---|---|---|---|
| | 1 Day | 7 Days | 14 Days | 1 Day | 7 Days | 14 Days |
| UV | 7 cN | 10 cN | 12 cN | 43 cN | 42 cN | 47 cN |

Example 6

| Curing | Release Value for Tesa$^R$ 4154 | Release Value for Tesa$^R$ 7475 |
|---|---|---|
| UV | 234 cN | 554 cN |

Release values of Comparison Example 9, which is not of the invention

| Curing | Release Value for Tesa$^R$ 4154 | Release Value for Tesa$^R$ 7475 | | |
|---|---|---|---|---|
| | 1 Day | 1 Day | 7 Days | 14 Days |
| Electron beam | Del.*) | 750 cN | 1632 cN | 2103 cN |

*)Delamination (detachment of release coating from substrate).

We claim:

1. Organopolysiloxanes having terminally, laterally or both, at least one group of the formula

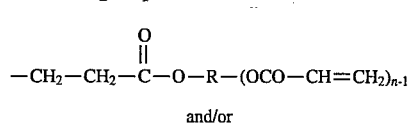

and/or

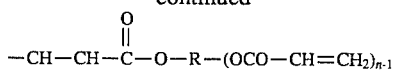

wherein n is an integer number of at least 2 and

R is a multivalent linear or branched aliphatic or aromatic hydrocarbon, optionally containing alkoxy groups, obtained by hydrosilylation of an organopolysiloxane having at least one SiH group with acrylate groups-containing compounds of the formula R-(OCO—CH=CH$_2$)$_n$ in equimolar amount in relation to each SiH group at a temperature of about between 60° and 130° C. in the presence of a rhodium catalyst.

2. The organopolysiloxanes of claim 1, further comprising that the hydrosilylation is carried out with hydrogenpolysiloxanes of the general formula

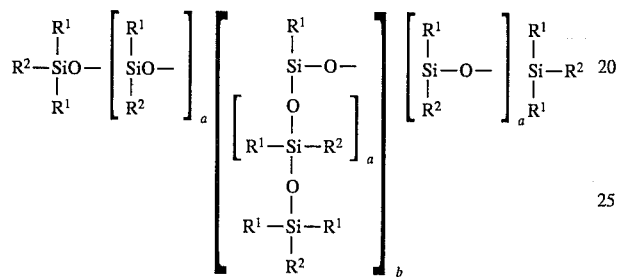

wherein

R$^1$ group is the same or different and represents alkyl groups with 1 to 4 carbon atoms or phenyl groups, with the proviso that at least 90% of the R$^1$ groups are methyl groups, R$^2$ group is the same as a R$^1$ group or is a hydrogen group, with the proviso that at least one R$^2$ group is a hydrogen group, and subscripts a has an average value of 0 to 100, and b has an average value of 0 to 5.

3. The organopolysiloxanes of claim 1 or 2, wherein compounds containing acrylate groups are acrylate esters of dihydric to hexahydric aliphatic linear or branched alcohols.

4. The organopolysiloxanes of claim 3, wherein compounds containing acrylate groups are 1,6-hexylene glycol acrylate, neopentyl glycol diacrylate, tetraethylene glycol diacrylate, polypropylene glycol diacrylate, glycerin triacrylate, trimethylolpropane triacrylate or pentaerythritol tetraacrylate.

5. The organopolysiloxanes of claim 1 comprising that the hydrosilylation is carried out in presence of the rhodium catalyst, which is selected from the group consisting of RhX$_3$·xH$_2$O, RhX$_3$(SR$^2$$_3$)$_3$, RhX(R$^3$$_3$P)$_3$, RhX(CO)(R$^3$$_3$P)$_3$, RhH(R$^3$$_3$P)$_4$, RhR$^4$$_3$, Rh(CO)$_2$R$^4$, and (RhX(olefin))$_2$, wherein X is a halogen group, R$^3$ is an alkyl group with 1 to 20 carbon atoms, an alkenyl group with 2 to 20 carbon atoms or the R$^3$$_3$SiQ group, in which Q is a divalent aliphatic group with 1 to 6 carbon atoms, R$^4$ is the 2,4-pentanedionato group, olefin is cyclooctadiene or norbornadiene, and x is a number from 0 to 4.

6. The organopolysiloxanes of claim 5, comprising that the hydrosilylation is carried out in presence of one of the rhodium catalyst selected from the group consisting of RhCl(Ph$_3$P)$_3$(Ph=phenyl), RhCl$_3$·3H$_2$O, (RhCl(ethylene)$_2$)$_2$ and (RhCl(cyclooctadiene))$_2$.

7. A curable binder or abhesive coating composition comprising an effective amount of organopolysiloxanes of claim 1 or 2, alone or in admixture with other curable coating compositions based on acrylate.

* * * * *